United States Patent [19]

Moon

[11] Patent Number: 5,779,825
[45] Date of Patent: Jul. 14, 1998

[54] PROCESS FOR MANUFACTURING ELECTRODE MATERIAL

[75] Inventor: Jung-Gi Moon, Yu Sung Gu, Rep. of Korea

[73] Assignee: Korea Institute of Machinery & Materials, Taeion, Rep. of Korea

[21] Appl. No.: 593,988

[22] Filed: Jan. 30, 1996

[30] Foreign Application Priority Data

Feb. 6, 1995 [KR]  Rep. of Korea .................. 95-2088

[51] Int. Cl.$^6$ .................................................. B22F 9/22
[52] U.S. Cl. .......................... 148/513; 75/351; 75/369
[58] Field of Search ................... 75/351, 369; 148/513

[56] References Cited

U.S. PATENT DOCUMENTS

| | | | |
|---|---|---|---|
| 4,462,845 | 7/1984 | Klar et al. | 75/369 |
| 5,405,572 | 4/1995 | DeVolk | 75/369 |

*Primary Examiner*—George Wyszomierski
*Attorney, Agent, or Firm*—Skjerven Morrill MacPherson Franklin & Friel LLP; Thomas S. MacDonald

[57] ABSTRACT

The present invention relates to the methods for the manufacture of an electrode material applicable to special bonding of a metal of the light metal group or for spot resistance welding. The method of making an electrode material of $Cu$—$Al_2O_3$ includes the steps of annealing $Cu$—$Al$ alloy powder in a vacuum state, and generating pure $Cu$—$Al$ alloy without oxide by reducing the annealed $Cu$—$Al$ alloy powder in a hydrogen atmosphere at 400°~500° C. A first oxidizing process oxidizes the surface of grains of the powder by heating the reduced $Cu$—$Al$ alloy powder in an air or in an oxygen atmosphere at 400°~500° C. In an internal oxidizing process, the Al in the $Cu$—$Al$ alloy powder is internally oxidized by heating the surface-oxidized $Cu$—$Al$ alloy powder in an inert gas atmosphere at 900° C.~1000° C. to oxidize the powder grains internally, and further in a reduction process, reducing the internally oxidized $Cu$—$Al_2O_3$ alloy powder in a hydrogen atmosphere.

7 Claims, 3 Drawing Sheets

PROCESS FOR MANUFACTURING ELECTRODE MATERIAL

BACKGROUND OF THE INVENTION

The invention relates to a method for forming an electrode material and manufacturing an electrode for the purpose of special bonding of a metal of the light metal group or for spot resistance welding and also to a method of manufacturing a resistance welding electrode of the above electrode material.

The electrode has application to special bonding of light metals and to special surface-treated steel plates or to resistance welding where the electrode has special characteristics of high temperature resisting strength, good electrical and heat conductivity, wear resistance etc of the electrode. To form the electrode provided with such electrode characteristics, the material itself also must require not only the characteristics of high temperature resisting strength, electric conductivity, and heat conductivity, but also requires homogeneity, for a uniform structure and good workability under the various conditions. An electrode with these good characteristics is formed only from an electrode material having such various good special features. By using such electrode, easier and better working of the welded parts can be achieved.

The resistance welding electrode during welding work functions for fusion bonding of the welded part as well as transferring an electric current to the part as an electrical conductor. The electrode is provided with characteristics compatible with the welded parts and the welding conditions chosen. In general the electrode under operating conditions is exposed to cyclic high temperature and pressure in succession requires high temperature resisting strength as well as electrical characteristics meeting the electric conductivity specially at the high temperature. To sustain the resistance welding electrode applied for an extended time at such high temperature and pressure conditions, metal material of the electrode basically requires the characteristic of low ability to seize with the metal of the welded elements as well as having a low degree of diffusion.

Therefore, at the initial stage of applied electric resistance welding, pure copper of high electric conductivity, good workability, and good anti corrosive properties for its electrode was mostly utilized, however the pure copper has a weakness of low mechanical strength.

For the purpose of improving the above-mentioned weakness, the dispersion strengthened alloys utilize the metal phase as the dispersion material by adding a small quantity of each of Cr, Zr ,Be, Si, Ni, W etc to the base metal of Cu, had been developed. However such alloys have the problem of poor uniform characteristics to heat resistance, poor electric and heat conductivity and result in a limited electrode quality.

For example, a Cu—Cr alloy with the Cu in high giving most weight percent in all the dispersion strengthened alloys, as in the current resistance welding electrode material, provides a fine Cr precipitation phase of less than 2 wt % distributed in the Cu base after solidifying, as manufactured in the typical casting method. The high temperature state due to the arc heat generated during welding work from a drawing, rolling or forging process utilizing the electrode, on the basis of the above mentioned Cu—Cr alloy, results in coarsening of the Cr precipitation phase and the growth of the Cu base phase to cause trouble, such as deteriorating thermal stability of the electrode and further declining the material life.

As a solution for the problem of such Cu—Cr alloys, the dispersion strengthened copper to oxide origin containing oxide dispersion phase has been developed. Cu—$Al_2$, Cu—$SiO_2$, Cu—$ZrO_2$ and the like are some examples of such dispersion-strengthened Cu alloys. Cu—$Al_2O_3$ has been identified as the most effective dispersion-strengthened material. Various studies for such dispersion-strengthened copper (Cu—$Al_2O_3$) have been made.

The dispersion-strengthened copper (Cu—$Al_2O_3$) of $Al_2O_3$ origin is created by combining powder metallurgy and an internal oxidation process. At first, a spherical Cu—Al alloy powder is formed by an atomization process through inducing and heating Cu—Al alloy mixed with oxidized copper ($Cu_2O$) powder ,and such mixed Cu—Al powder is internally oxidized in an oxygen gas atmosphere which volume of oxygen ($O_2$) is properly adjusted. Selectively oxygen is combined with an Al atom to form the $Al_2O_3$ phase in the Cu powder. During internal oxidation $Cu_2O$ oxidizing agent is dissolved into Cu and $O_2$ to be diffused into Cu—Al powder, during which time the oxygen gas is diffused into the powder, reacting and combining with the Al atom to form the oxidized aluminum phase ($Al_2O_3$) in the Cu powder and to generate Cu— Cu—$Al_2O_3$ applicable to the material for manufacture of the electrode.

Such dispersion strengthened copper ($Al_2O_3$) maintains superior creep resistance which characteristic is maintained at a high temperature. Also the Cu—$Al_2O_3$ alloy when intended as a welding electrode results in only a small decline in electric conductivity, due to the thermodynamic characteristics in the $Al_2O_3$ dispersion phase which does not exist as a solid solution in the Cu base.

Thus in manufacturing the electrode of dispersion strengthened copper by the above mentioned method, Cu—$Al_2O_3$ powder which is internally oxidized is reheated again in a reduction gas atmosphere, peeling off the oxidation film from the powder. After the Cu—$Al_2O_3$ powder is free from the above film, the powder is heat extruded at a temperature of 760° C.~927° C. and it is again drawn or forged producing an electrode tip in the required form (for example, a cone form).

However the dispersion strengthened copper $Al_2O_3$ alloy is internal oxidized by mixing the relevant volume of oxidizer $Cu_2O$ in Cu—Al powder, followed by heating at a high temperature. However, due to its delicate mixing procedure with the proper volume of $Cu_2O$ for controlling the internal oxidation state, one is unable to find the oxide in a uniform dispersion. Therefore in manufacturing the electrode by a process of extrusion, drawing, or forging of above Cu—$Al_2O_3$ powder, such product has not only poor workability but also insufficient structural fineness, together with low strength resulting in the problem of not obtaining an electrode provided with good uniformity.

SUMMARY OF THE INVENTION

Therefore one of the objectives of the present invention is to provide an electrode of good characteristics and the manufacturing technology of the electrode material processed by surface oxidizing a pure Cu—Al alloy powder at a first stage followed by internal oxidizing at a second stage.

Another objective for the present invention is to provide an electrode with better workability and bonding capability during forming the specified electrode of such electrode material free from the oxide existing on the Cu—$Al_2O_3$ surface by reducing the electrode of Cu—$Al_2O_3$ powder generated from the first oxidation and the second internal oxidation treatment for Cu—Al alloy powder.

The process for forming the electrode according to the present invention is to form Cu—Al alloy powder through melting Cu and Al, and an injection process, which is annealed and is reduced in a hydrogen atmosphere and to form pure Cu—Al alloy powder free from oxide. The surface of such pure Cu—Al alloy powder is oxidized at the first stage and is again further heated at the high temperature in the inert gas atmosphere to internally oxidize Al in the Cu—Al alloy powder at a second stage where a Cu—$Al_2O_3$ powder of homogeneous $Al_2O_3$ volume is formed. The electrode formed by above mentioned process has high temperature resistance, and good electric and thermal conductivity.

Hereinafter the technique of manufacturing the electrode material and the electrode are described in detail according to the claims of the invention as follows:

Cu and a small amount (0.1~5wt %) of Al alloy is fed into to be heated and melted (melting process) followed by injecting the molten Cu—Al alloy through atomizing, such that a Cu—Al alloy powder is formed (atomizing process).

In the above processes for forming Cu—Al alloy, those steps of melting and atomizing may in general use presently known technology, however oxide exists on the surface of Cu—Al alloy powder generated by the above processes such surface oxide should be removed sufficiently to form pure Cu—Al alloy powder.

In case Cu—Al alloy powder containing oxide on its surface is put into the next process of internal oxidizing treatment forming Cu—$Al_2O_3$ powder, it has the difficulty of adjusting the $Al_2O_3$ also content in Cu—$Al_2O_3$ powder but also may contain copper oxide (CuO, $Cu_2O$) in the Cu—$Al_2O_3$ powder. In case the resistance welding electrode containing such impurities is manufactured, it may cause a problem of very poor electric conductivity.

Therefore, in case of generating its powder by atomizing Cu—Al alloy its pure alloy, powder without oxide at all should be obtained and oxide existing on the surface of Cu—Al alloy powder always has to be removed.

One of the methods for removing the oxide on the surface of Cu—Al alloy powder which is generated by the above mentioned melting and atomizing processes is:

As Cu—Al alloy powder containing oxide is heated at the temperature 700° C.~900° C. in the vacuum state and annealed, the internal stress existing in crystal grains of Cu—Al alloy powder is removed and the grains are finer. At the same time the oxidation film formation on the surface of Cu—Al alloy powder is released by hydrogen ($H_2$) penetrating into the oxide existing in Cu—Al alloy powder at the next reducing stage (Annealing process) followed by reducing Cu—Al alloy powder under hydrogen atmosphere at a temperature of 400° C.~500° C., by which result pure Cu—A alloy powder free from the oxide is obtained. (reduction stage of the process).

And as one of the other methods which obtains pure Cu—Al alloy powder by atomizing molten Cu—Al alloy, the atomizing process of Cu—Al alloy is implemented without oxygen by cutting off inflow of $O_2$ during forming of Cu—Al alloy powder dispersion (atomizing process at nonoxygen atmosphere). As such Cu—Al alloy powder obtained from the atomization process in an atmosphere free from oxygen is heated in the vacuum state for annealing (annealing process in the vacuum), pure Cu—Al alloy powder without passing through the previous reducing process could be obtained directly.

However as the processes for providing such continual atmosphere for atomizing at a non-oxygen state and for annealing in the vacuum, face various complicated problems, and such may cause a higher cost factor for maintaining the manufacturing procedures, it is recommended to choose processes in compliance with the economic and easy manufacturing techniques for the purpose of getting pure Cu—Al alloy powder.

In case the pure Cu—Al alloy powder free from oxide is heated at the temperature 400° C.~500° C. in the air or oxygen the surface oxidation of Cu—Al alloy powder is progressed (first oxidizing stage) which first detailed test data is shown as an example:

The measured result, after Cu—Al alloy powder of 100 g in the constant-temperature oven is heated for 5 minutes at the temperature 400° C.~500° C. in the ambient air or oxygen, showed the achieving of sufficient oxidation on the surface of the Cu—Al alloy powder (2Cu+½ $O_2 \rightarrow Cu_2O$).

The Cu-Alloy powder when the oxidation process is finished is reheated at the temperature 900° C.~1000° C. in an inert gas atmosphere such as argon or helium for 0.5~1 hours so that Al in the Cu—Al alloy powder may be internally oxidized (second stage of oxidation) ($Cu_2O$ 2Cu+ ½$O_2$—, 2Al+¾$O_2 \rightarrow 2Al_2O_3$) the volume of $Al_2O_3$ is uniformly adjusted and also an electrode material, as Cu—$Al_2O_3$ powder form, of good quality is obtained.

Internally oxidized alloys are a special type of precipitation-hardened alloys. These are two-phase systems which are hardened by the presence of hard inclusions of the second phase (namely the oxide particles).

Stability of the structure of precipitation-hardened alloys is determined from the degree of diffusion. Namely the atomic exchange between the inclusions of the second phase and the alloy determines the stability of the structure.

High thermal stability of the structure is certainly achieved if the hardening phase is a high-melting compound which does not contain the atoms of the alloy base metal. In such case the oxides are the most high-melting of the chemical compounds.

Higher degree of dispersion of the particles of hardening phase distinguishes internally oxidized alloy from the alloys of SAP type (Sintered Aluminum Products). This makes it possible to obtain the alloys of high strength with low volume content of hardening phase ($Al_2O_3$). The latter provides high values of electric and heat conductivity of the alloys, which are comparable to those of pure copper.

Internal oxidation is conducted with the alloys whose metal-base dissolves oxygen, the absolute value of free energy of formation-F oxide of the component of alloy being far in excess of the value for the alloy base metal. The reaction of oxide formation is accompanied by heat loss. If the pressure of oxygen-$O_2$ at the alloy surface is equal to that of dissociation of metal-alloy base oxide, then without oxidizing the alloy base metal the oxygen diffuses in the alloy.

The partial pressure of oxygen: $PO_2$ at the sample surface at the temperature of internal oxidation is determined by the equilibrium constant of the following reaction:

$$Cu_2O = 2Cu + ½O_2$$

The equilibrium constant—KP is determined from the following expression $$log KP = -FT/(2.303RT),$$

FT is the change in the free energy which accompanies the reaction at T. Since $Cu_2O$ and Cu are used in condensed state, then K p=$PO_2$½[K p=P2Cu. $PO_2$½/(P$Cu_2O$)] is formulated.

In the process of internal oxidation, pressure of oxygen at the material surface is constant, and its solubility in the sample is proportional to the square root of $PO_2$ according to Henrys law. If the pressure is no more than the partial pressure of the lower oxide such as $Al_2O_3$ or BeO etc of the alloy base metal, then no external scale forms. For internal oxidation in case the oxygen pressure on the surface of the material is constant the solubility of the oxygen for the sample is in accordance with Henrys Law and thus the surface is usually oxidized at the temperature at which it is negligible in the alloy base. The resulting oxide film is firm enough not to peel off the surface.

Next to the formation of the oxide film, by raising the temperature, oxygen absorbed at the sample surface diffuse inside, meets the atoms of powerful oxidizing components of alloy and enters into reaction with them, forming the molecules of oxide. The process of internal oxidation takes place at last.

The size of the oxide particles of the hardening alloys depends on both process temperature and concentration of the oxidizing agent (the oxidizing agent formed at the first treatment).

If oxide exists on the surface of Cu—$Al_2O_3$ powder of electrode material, a specified profile of electrode is formed, which hinders bonding between each metal powder particle, necessitating a reduction process for removing it at the temperature 400° C.~500° C. for 0.5 hours in a hydrogen atmosphere and further cooling off down to the room temperature in the same atmosphere to obtain such electrode (reduction process). Based on the above mentioned material, it would be possible to obtain an electrode of better workability and fine structure.

How to choose the relevant manufacturing method for the superior electrode based on aforementioned material might be a very important factor.

Another purpose of the present invention based on the good quality of Cu—$Al_2O_3$ out of which $Al_2O_3$ volume is uniformly adjusted and has a good workability is to form the electrode by an exploding and pressing process of the material which is pressed and solidified through a shock wave load from exploding explosives and thereby to provide a method for manufacturing a good quality of electrode with strength for better welding workability (fusion bonding force) for the welded elements, and maintaining a low degree of diffusion during the operation at high temperature and pressure.

The practical examples for the application of the present invention are described in the drawings as the following. The present invention proposes two exploding and pressing methods of Cu—$Al_2O_3$ powder. One is to press flat mostly as the plate form of the powder in the base material by transferring the high potential energy erupted from the shock wave by exploding explosive to a flyer plate, and the other, to solidify mostly a bar type electrode in a pipe form of a container by the shock wave formed by the exploding explosives.

DETAILED DESCRIPTION OF THE INVENTION

Figure 1:
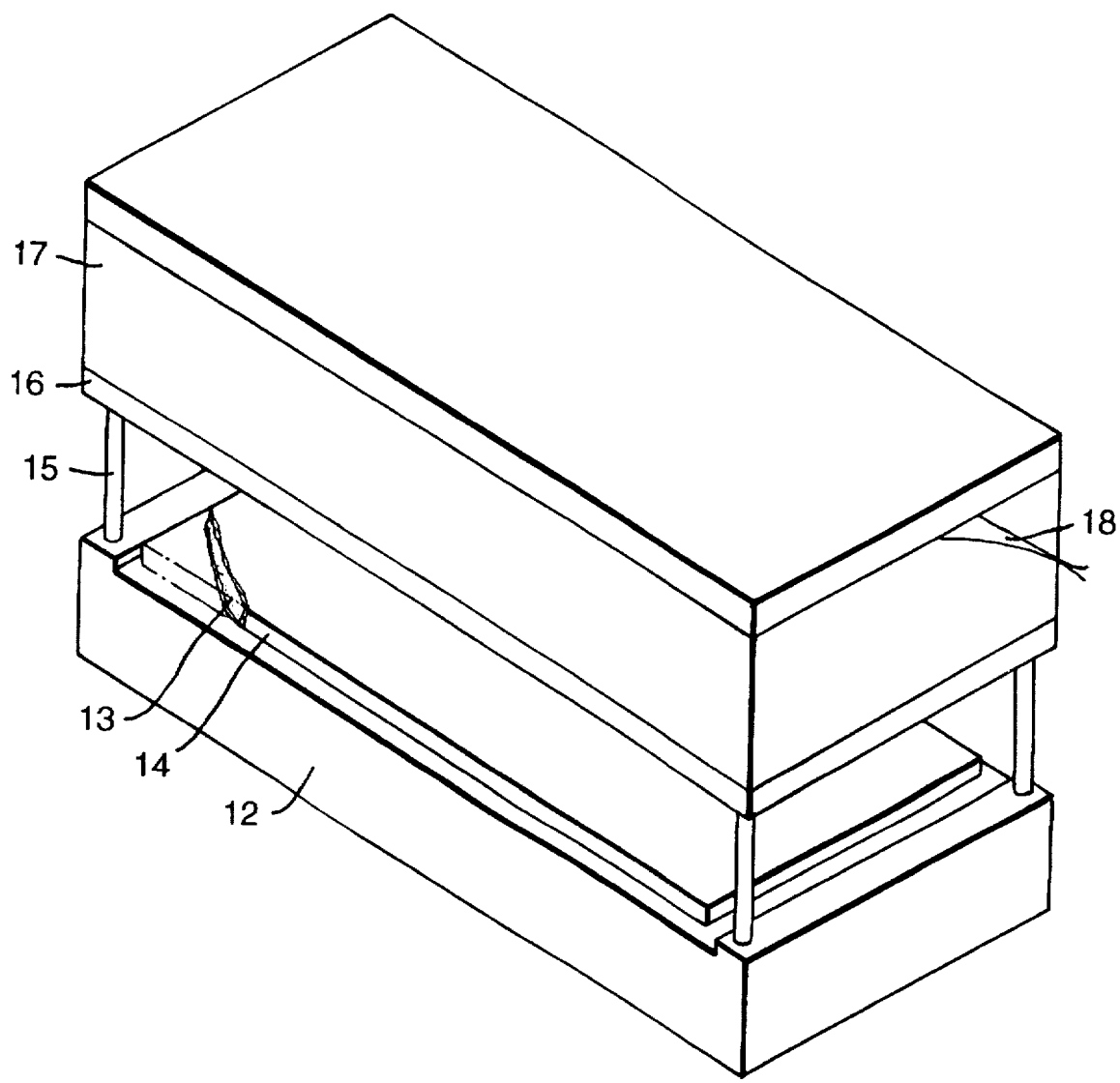
FIG. 1 shows a perspective view of apparatus for mounting metal powder together with explosives on a exploding cladding device.

As shown in FIG. 1 a powder container (14) is filled with Cu—$Al_2O_3$ powder (13) formed by the above mentioned process. The container (14) is mounted over the base plate (12). A flyer plate (16) is installed over container (14) with stand offs (15) maintaining a specified gap therebetween and to let the flyer plate (16) sustain a specified kinetic energy. At the same time the base plate (12) and flyer plate (16) each are placed relative to each other at a specified distance from each other. On the flyer plate (16), high explosives (17) of powder or sheet form is mounted, on which plate (16) a detonator (18) is connected for detonating the explosives (explosive mounting process).

Figure 2A:
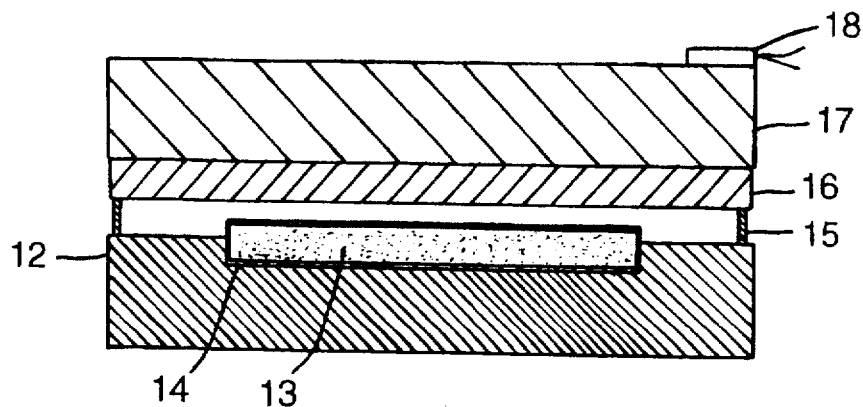
FIG. 2A, 2B and 2C show cross sectional views of the steps of the process for pressing the electrode of plate form processed by the exploding and cladding device.
Figure 2B:
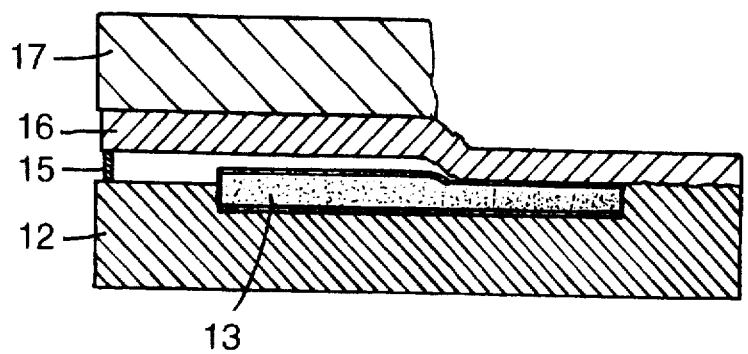
Figure 2C:
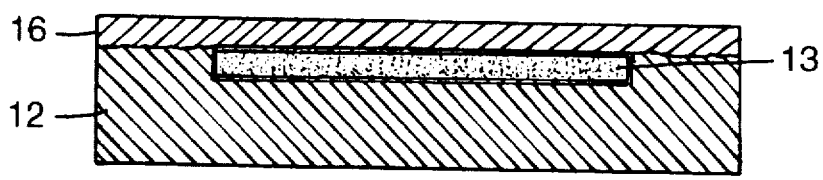

FIGS. 2A, 2B and 2C shows the steps for the process of exploding and pressing the plate form of electrode by A) igniting the detonator on the exploding device which activates the finishing explosive mounting process. The explosives on one side are exploded by the detonator, B) the flyer plate is impacted on the base plate at an specified angle by the explosion pressure (shock wave) and the plate form of electrode is built up C) from bonding action between each particle of Cu—$Al_2O_3$ in the container against the base plate.

The aforementioned process is achieved in a moment, the metal portion in the rear of the impacting point is in a flowing state from which the metal jet flow is generated at the front of that point. This jet flow leads to removal of the impurities on the boundary plane of each powder particle to get a clean surface and to develop strong plastic deformation and bonding only at the nearby cladding boundary plane. At this moment the cladding boundary surface shows a special wave pattern.

The explosion pressure during the process generates the strong shock wave of 6 Gpa (Giga Pascal) by which the impacted and pressed plane is of explosive cladding. This method could achieve the monolithic electrode material with particle deformation of a fungoid shape as a proof of a dynamic compacting regime, indicates cladding due to localization of flow at the contacting plane between each particle boundary.

The electrode material manufactured under such explosive compacting process showed the density of 95~98% for pure copper measured by hydrostatic weighing.

Figure 3:
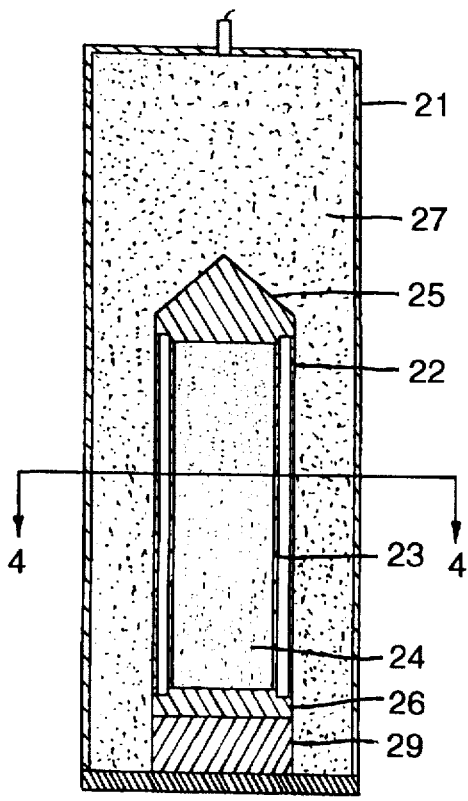
FIG. 3 shows a cross sectional view of apparatus mounting metal powder together with the explosives on an exploding cladding device.
Figure 4:
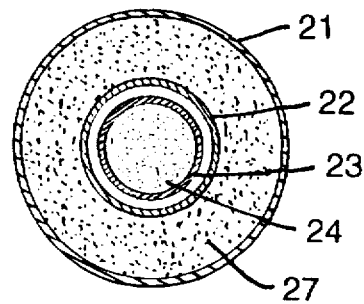
FIG. 4 shows the cross sectional view taken on the line 4—4 of FIG. 3.
Figure 5:
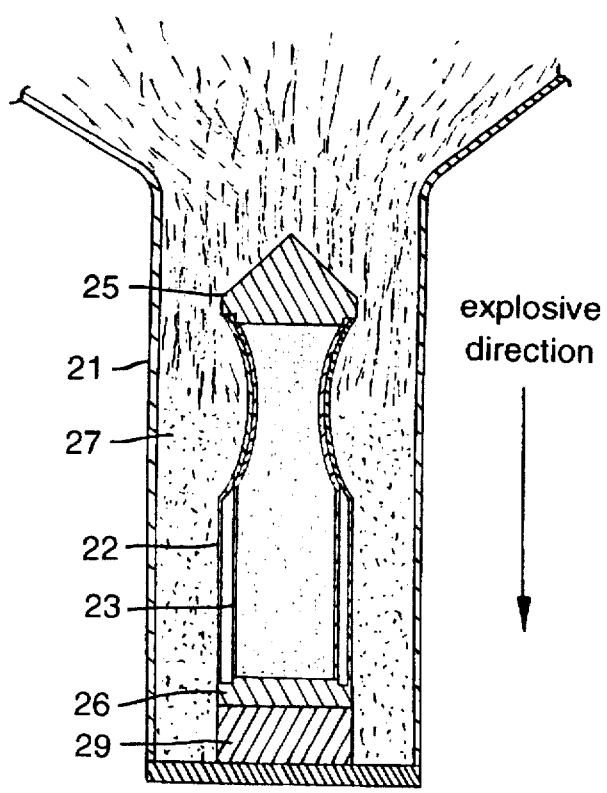
FIG. 5 shows cross sectional view for each process instantly pressing the electrode of bar form by an exploding and cladding force.

FIG. 3–FIG. 5 show the forming process for the bar type electrode by explosive compacting of Cu—$Al_2O_3$ powder.

As shown in FIG. 3, an explosives container (21) of double cylindrical structure, includes a flyer tube (22) mounted around a powder container (23). Cu—$Al_2O_3$ powder 24 of the electrode material is charged into container 23 and both end portions of the powder container (23) is sealed with plugs (25,26). The container (23) is mounted on the support (29) maintaining a specified gap in the flyer tube (22). Between the above mentioned flyer tube (22) and explosives container (21) the explosive (27) is charged. A detonator (28) is installed at one end portion of container (21) (explosives installing process).

After finishing the explosives installing process, the detonator is ignited in an instant and at the same time the explosion at one side of the explosives generates a shock wave, the advance of which is transferred in an instant shock speed (explosion speed) in the longitudinal direction of the flyer tube (22) (explosive compacting process).

As a result of such explosion, the flyer tube and Cu—$Al_2O_3$ powder therein is concentrically compacted (FIG. 5) by the shock wave which narrows the gap between each metal powder particle and transfers the shock energy to the surface of each metal powder particle in an instant.

This reaction is almost similar to those of the isentropic process. If the generating and transfer procedures for the shock energy is achieved in slow speed, the heat is transferred from the environment into the metal powder particle which result shows a negative trend such as fusion through an instant change of original electrode material characteristics. Thus in the exploding process according to the present invention the goal of maintaining the superior quality of the electrode can be achieved by means of transferring the shock wave energy through the metal powder in a few micro seconds.

However the shock wave strength generated during the exploding process is chosen so as to bond the powder and also should not be so high so as to crack the compacted forming part, due to over fusion and incidental reaction. According to the result of experiment the explosion speed for the shock wave transfer ranges from 1600 m/sec to 8400 m/sec, however 2000 m/sec~3000 m/sec for the optimum speed is recommended.

The exploding pressure generated at this moment is is estimated to range between 5~500 kbar, however 10~300 kbar (from 1 Gpa to 30 Gpa) is recommended.

What is claimed is:

1. A method of manufacturing electrode material of Cu—$Al_2O_3$ comprising the steps of:
   (1) annealing Cu—Al alloy powder in a vacuum state;
   (2) generating pure Cu—Al alloy metal powder free from oxide by reducing the annealed Cu—Al alloy powder in a hydrogen atmosphere at 400° C.~500° C.;
   (3) oxidizing the surface of grains of the powder by heating the reduced Cu—Al metal alloy powder in the air or in an oxygen atmosphere at 400° C.~500° C.;
   (4) getting the Al in the Cu—Al alloy metal powder oxidized internally by heating the surface-oxidized Cu—Al alloy metal powder in an inert gas atmosphere at 900° C.~1000° C. to oxidize the powder grains internally and
   (5) reducing the internally oxidized Cu—$Al_2O_3$ metal alloy powder in a hydrogen atmosphere.

2. A process for making Cu—Al powder useful for making a resistance welding electrode, comprising the steps of:
   reducing oxidized Cu—Al alloy powder into pure Cu—Al alloy powder by heating the oxidized Cu—Al powder in a hydrogen atmosphere;
   oxidizing the surface of the pure Cu—Al alloy powder in an oxygen atmosphere by heating the powder; and
   oxidizing internally the Cu—Al powder grains in an inert gas atmosphere by further heating the surface-oxidized powder.

3. A process according to claim 2, wherein said step of oxidizing the surface is performed at a temperature of 400° C.~500° C.

4. A process according to claim 2, wherein said step of oxidizing internally is performed at a temperature of 900° C.~1000° C.

5. A process according to claim 2, wherein the step of reducing is performed at a temperature of 400° C.~500° C.

6. A process according to claim 2, wherein said inert gas comprises argon.

7. A process according to claim 2, wherein said inert gas comprises helium.

* * * * *